(12) United States Patent
Suwa et al.

(10) Patent No.: US 7,656,489 B2
(45) Date of Patent: Feb. 2, 2010

(54) LIQUID CRYSTAL DISPLAY AND METHOD OF MANUFACTURING SAME

(75) Inventors: Shunichi Suwa, Kanagawa (JP); Tsuyoshi Kamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 80 days.

(21) Appl. No.: 11/939,236

(22) Filed: Nov. 13, 2007

(65) Prior Publication Data
US 2008/0123038 A1 May 29, 2008

(30) Foreign Application Priority Data
Nov. 17, 2006 (JP) .............................. 2006-311944

(51) Int. Cl.
*G02F 1/1337* (2006.01)
*G02F 1/1333* (2006.01)
(52) U.S. Cl. ..................... 349/129; 349/187; 349/190
(58) Field of Classification Search ................. 349/123, 349/129, 187, 190
See application file for complete search history.

(56) References Cited
U.S. PATENT DOCUMENTS
6,977,704 B2 * 12/2005 Kataoka ..................... 349/130

FOREIGN PATENT DOCUMENTS
JP 2002-357830 12/2002
JP 2004-302260 10/2004

OTHER PUBLICATIONS

A Japanese Office Action dated Oct. 22, 2008 issued in connection with counterpart Japanese Patent Application No. 2006-311944.

* cited by examiner

*Primary Examiner*—Kevin S Wood
(74) *Attorney, Agent, or Firm*—Sonnenschein Nath & Rosenthal LLP

(57) ABSTRACT

Provided is a liquid crystal display enabling well-balanced improvement of contrast and the response speed against voltage application, in vertical alignment mode using a vertical alignment type liquid crystal. A liquid crystal display includes a couple of substrates disposed facing each other, and a liquid crystal layer disposed between the pair of substrates, the liquid crystal layer containing liquid crystal molecules having a negative dielectric anisotropy, each pixel in the liquid crystal layer having more than two regions, the liquid crystal molecules in one of the regions having a pre-tilt angle different from that of the liquid crystal in another region.

2 Claims, 8 Drawing Sheets

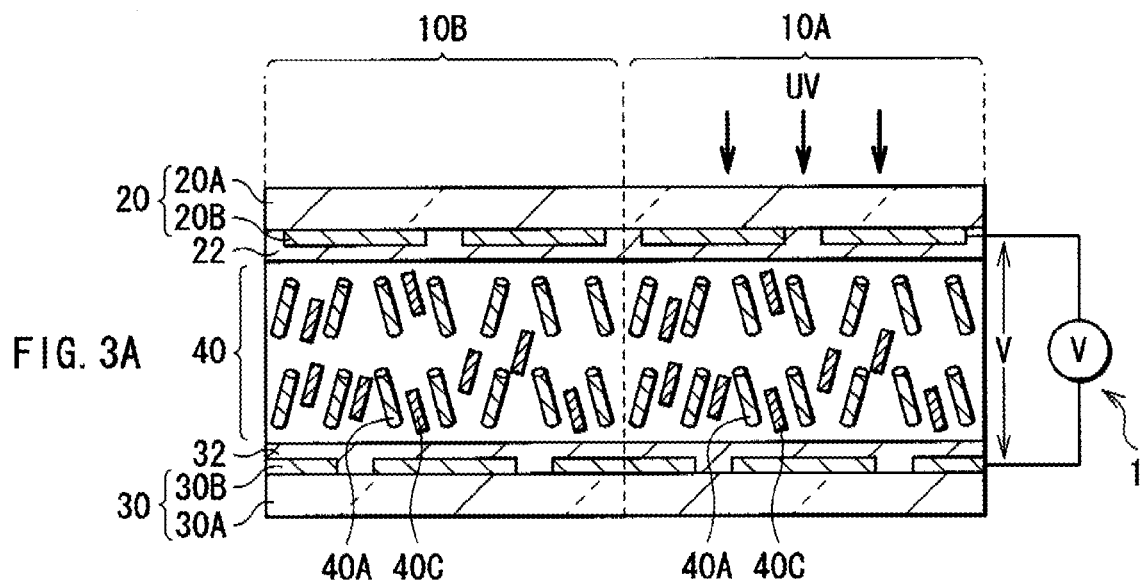
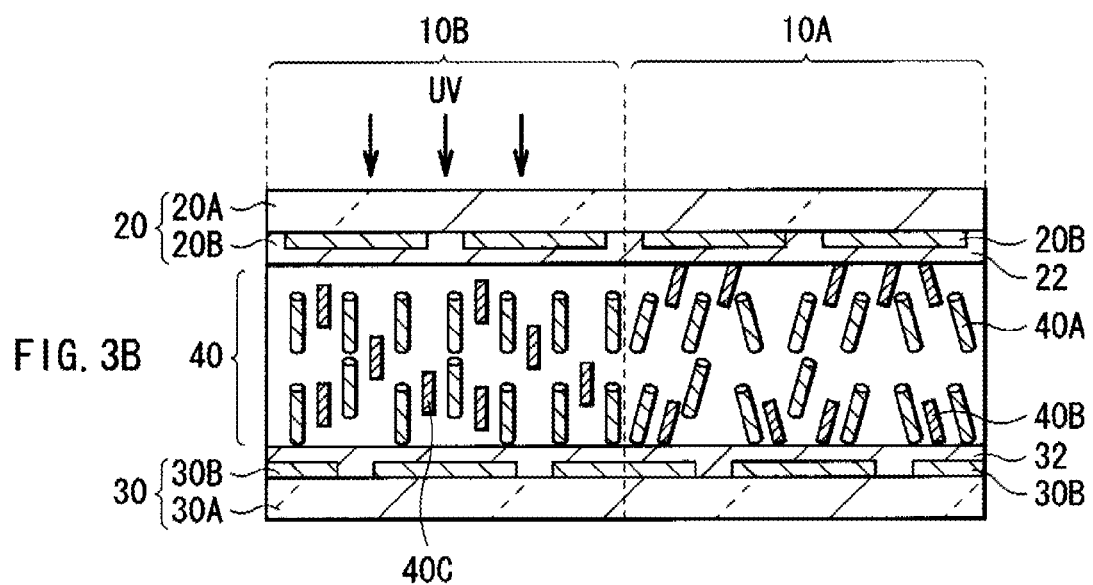

LIQUID CRYSTAL DISPLAY AND METHOD OF MANUFACTURING SAME

CROSS REFERENCE TO RELATED APPLICATIONS

The present invention contains subject matter related to Japanese Patent Application JP 2006-311944 filed in the Japanese patent Office on Nov. 17, 2006, the entire contents of which being incorporated herein by reference.

BACKGROUND OF THE INVENTION

1. Field of the Invention

The present invention relates to a liquid crystal display provided with a vertical alignment type liquid crystal, as well as a method of manufacturing the liquid crystal display.

2. Description of the Related Art

Recently, liquid crystal displays performing image display by driving display elements using liquid crystal have been widely used. These liquid crystal displays are constructed to perform display by changing the array of liquid crystal molecules to transmit and modulate the light from a light source, in a liquid crystal layer sealed between substrates composed of glass or the like. Depending on the liquid material of the liquid crystal layer, there are different display modes. There is growing interest in VA (vertical alignment) mode using a vertical alignment liquid crystal, which can realize a wide viewing angle.

FIG. 10 shows a cross-sectional configuration of a liquid crystal display of a general AV mode. In the VA mode, with no voltage applied, liquid crystal molecules 400A within a liquid crystal layer 400 sealed between a driving substrate 200 and an opposed substrate 300 are aligned vertically to the substrate plane. Electrodes 201 and 301 having slits not opposed to each other are disposed on the opposed surfaces of the substrates 200 and 300, respectively. When a voltage is applied to the liquid crystal layer 400 in this state, an oblique electric field is exerted on the liquid crystal layer 400. In response to this, the liquid crystal molecules 400A lie in a direction parallel to the substrates, enabling light to be transmitted. This is because the liquid crystal molecules of the VA mode have a negative dielectric anisotropy, namely the property that the dielectric constant in the molecular long axis direction is smaller than that in the molecular short axis direction.

SUMMARY OF THE INVENTION

However, in response to the voltage, the liquid crystal molecules aligned vertically to the substrates can lie in any direction. Due to an irregular lying direction of the liquid crystal molecules when the voltage is applied, the response speed against voltage is lowered.

In view of the foregoing, Japanese Unexamined Patent Application Publication No. 2002-357830 discloses, as shown in FIG. 11, the technique of causing polymers 400B to hold liquid crystal molecules 400A in a slight tilt from the normal to the substrate plane (so-called pre-tilt). The pre-tilt can be obtained as follows. That is, a liquid crystal layer 400 composed by adding monomers having photopolymerizing properties is sealed between the substrates. With the liquid crystal molecules 400A tilted by application of a voltage, exposure is performed to polymerize the monomers. Owing to the pre-tilt, the lying direction of the liquid crystal molecules can be predetermined with no voltage applied, thus improving the response speed against voltage.

With the configuration disclosed in the above publication, even in the undriven state (when displaying black), the liquid crystal molecules are aligned in a slight tilt position with respect to the normal to the substrate plane, the response speed against voltage can be improved, whereas a slight light may be transmitted when displaying black, contributing to a drop in contrast. Accordingly, there are demands for a liquid crystal display enabling well-balanced improvement of contrast and the response speed against voltage, and for a method of manufacturing the liquid crystal display.

It is desirable to provide a liquid crystal display enabling well-balanced improvement of contrast and the response speed against voltage, and a method of manufacturing the liquid crystal display.

According to an embodiment of the present invention, there is provided a liquid crystal display including a couple of substrates disposed facing each other, and a liquid crystal layer disposed between the pair of substrates. The liquid crystal layer contains liquid crystal molecules having a negative dielectric anisotropy, and each pixel in the liquid crystal layer has more than two regions, the liquid crystal molecules in one of the regions having a pre-tilt angle different from that of the liquid crystal in another region. The pre-tilt angle means the magnitude of an angle which the liquid crystal molecular long axis direction makes with the normal direction to the substrate plane, where the direction of the normal to the substrate plane is taken as 0°.

According to other embodiment of the present invention, there is provided a method of manufacturing a liquid crystal display including the steps of sealing between a couple of substrates disposed facing each other and a liquid crystal layer composed of a vertical alignment liquid crystal containing monomers; polymerizing the monomers in a first region within a pixel, with a first voltage applied between the couple of substrates holding the liquid crystal layer in between; and polymerizing the monomers in a second region within a pixel, with a second voltage different from the first voltage applied between the couple of substrates sealing the liquid crystal layer in between.

In the liquid crystal display according to an embodiment of the present invention, each pixel in the liquid crystal layer disposed between a pair of substrates has more than two regions, the liquid crystal molecules in one of the regions having a pre-tilt angle different from that of the liquid crystal in another region. For a low driving voltage, liquid crystal molecules having a relatively large pre-tilt angle respond to the voltage to transmit light. For a high driving voltage, the liquid crystal molecules of the entire liquid crystal layer, including the liquid crystal molecules having a relatively small pre-tilt angle, respond to transmit light. This enables a considerable improvement of response speed compared with a liquid crystal display not provided with any pre-tilt. Further, owing to the relatively small pre-tilt angle region in the liquid crystal layer, any increase in luminance when displaying black can be suppressed compared with a liquid crystal display provided with a pre-tilt throughout the entire surface of a liquid crystal layer.

In the method of manufacturing a liquid crystal display according to an embodiment of the present invention, depending on the region of the liquid crystal layer, the magnitude of a pre-tilt angle of liquid crystal molecules can be imparted by sealing between the substrates the liquid crystal layer composed by adding the monomers, and polymerizing within a pixel the monomers of a first region of the liquid crystal layer, with a first voltage applied, and then polymerizing the monomers of other region of the liquid crystal layer, with a second voltage different from the first voltage applied.

Thus, the liquid crystal display of an embodiment of the present invention includes the couple of substrates disposed facing each other, and the liquid crystal layer. The liquid crystal layer contains the liquid crystal molecules having the negative dielectric anisotropy, and each pixel in the liquid crystal layer has more than two regions, the liquid crystal molecules in one of the regions having the pre-tilt angle different from that of the liquid crystal in another region. This permits a considerable improvement of the response speed against voltage when the driving voltage is low. Further, an increase in luminance when displaying black can be suppressed by the presence of the relatively small pre-tilt angle region of the liquid crystal molecules in the liquid crystal layer. This enables well-balanced improvement of contrast and the response speed against voltage.

The method of manufacturing a liquid crystal display of an embodiment of the present invention includes the steps of sealing between a couple of substrates disposed facing each other and a liquid crystal layer composed of a vertical alignment liquid crystal containing monomers; polymerizing the monomers in a first region within a pixel, with a first voltage applied between the couple of substrates holding the liquid crystal layer in between; and polymerizing the monomers in a second region within a pixel, with a second voltage different from the first voltage applied between the couple of substrates sealing the liquid crystal layer in between. This permits manufacturing of the liquid crystal display enabling well-balanced improvement of contrast and the response speed against voltage.

Other and further objects, features and advantages of the invention will appear more fully from the following description.

BRIEF DESCRIPTION OF THE DRAWINGS

FIGS. 3A and 3B are schematic cross-sectional views for explaining the next succeeding step of FIG. 2;

DESCRIPTION OF THE PREFERRED EMBODIMENTS

A preferred embodiment of the present invention will now be described in detail with reference to the accompanying drawings.

Figure 1:
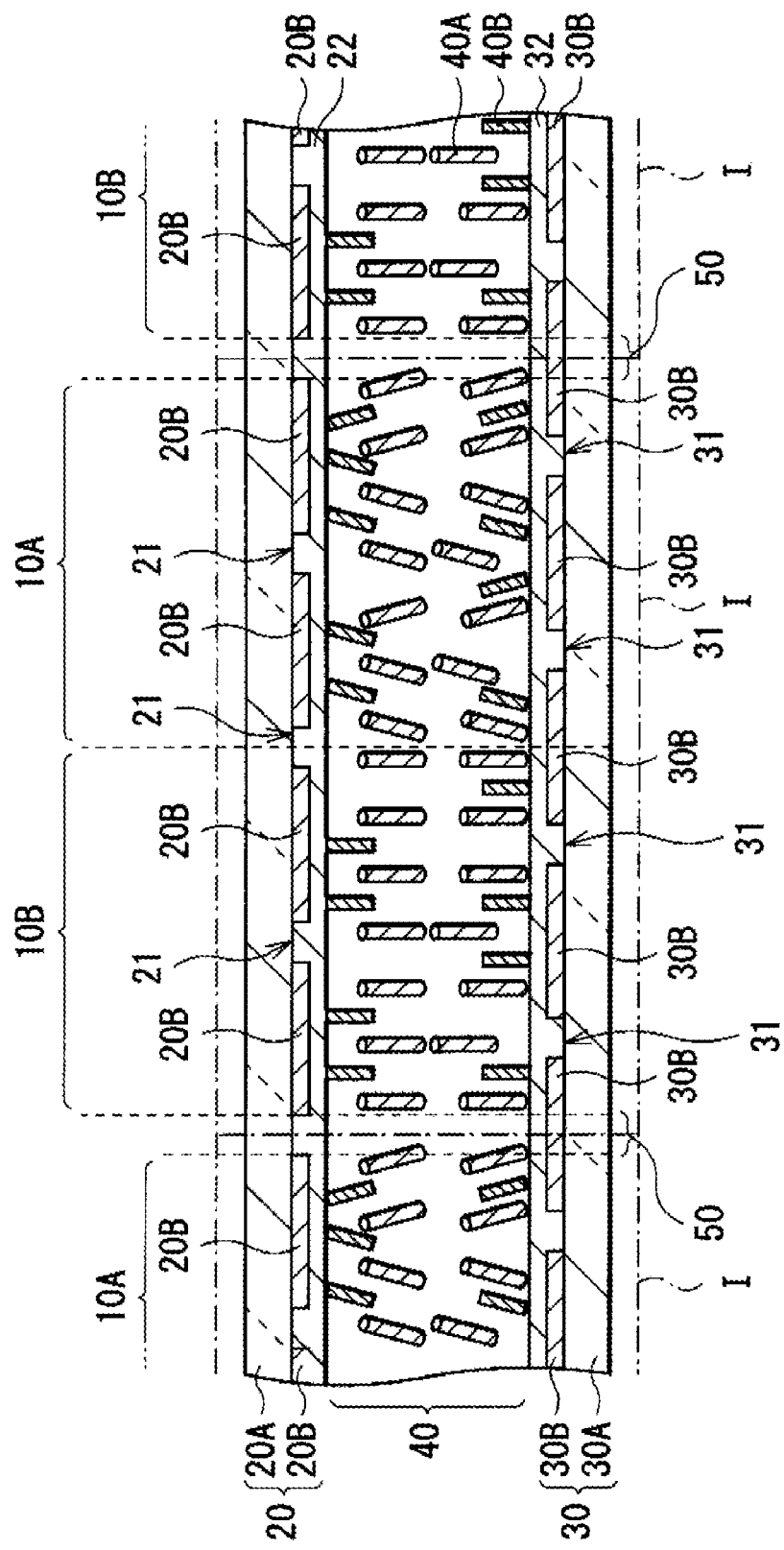
FIG. 1 is a schematic cross-sectional view of a liquid crystal display according to a preferred embodiment of the present invention.
Figure 5:
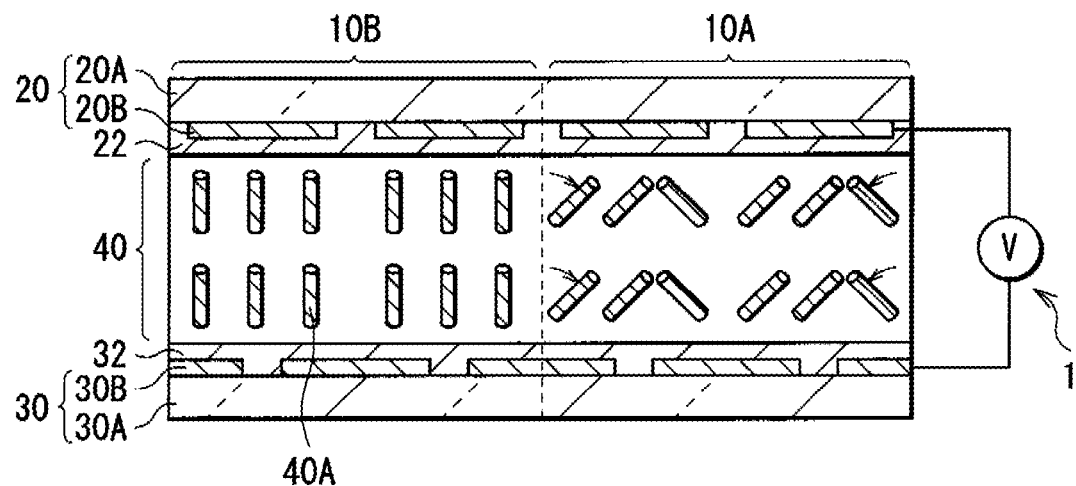
FIG. 5 is a schematic cross-sectional view for explaining situations where liquid crystal molecules respond to a voltage in a low gray scale.
Figure 6:
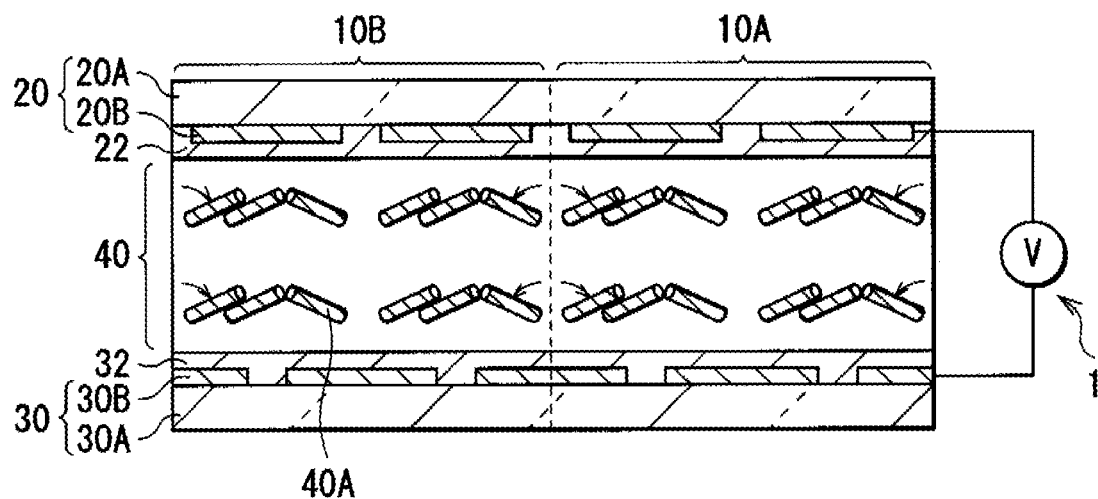
FIG. 6 is a schematic cross-sectional view for explaining situations where liquid crystal molecules respond to a voltage in a high gray scale.
Figure 7:
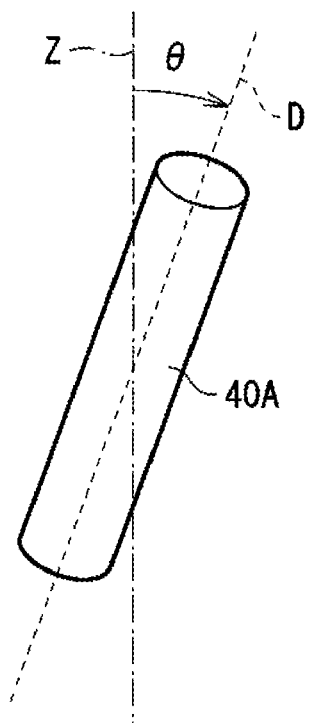
FIG. 7 is a schematic diagram for explaining a pre-tilt angle of liquid crystal molecules.

FIG. 1 is a schematic cross-sectional view of a liquid crystal display according to a preferred embodiment of the present invention. The liquid crystal display has a liquid crystal layer 40 between a TFT (thin film transistor) substrate 20 and a CF (color filter) substrate 30, with alignment films 22 and 32 in between. In particular, the liquid crystal layer 40 has, within a pixel, a first region 10A and a second region 10B having different pre-tilt angles. As shown in FIG. 7, the pre-tilt angle means an angle θ which the long axis direction D of liquid crystal molecules 40A makes with Z, where Z is a direction vertical to the substrate plane. The liquid crystal display has a plurality of pixels formed between the substrates, as shown in FIG. 1. For sake of simplicity, FIGS. 2 to 6 show only a region I (a pixel). In FIGS. 1 to 6, specific configurations of each substrate are omitted.

The TFT substrate 20 includes a plurality of pixel electrodes 20B arranged, for example, in a matrix on a glass substrate 20A. The TFT substrate 20 further includes a plurality of TFT switching elements, each of which has a gate, a source and a drain for driving the pixel electrodes 20B, and a plurality of gate lines and source lines (not shown) connected to the plurality of TFT switching elements, respectively. The pixel electrodes 20B are disposed in individual pixels electrically isolated by pixel separating parts 50 on the glass substrate 20A, and are electrodes having transparency made of ITO (indium tin oxide) or the like. The individual pixels of the pixel electrodes 20B are provided with slit parts 21 (in which no electrode is formed) having a stripe-like pattern, a V-shaped pattern, or the like.

The CF substrate 30 has, on the glass substrate 30A, a color filter (not shown) where, for example, red (R), green (G) and blue (B) filters are disposed in a stripe-shape, and an opposed electrode 30B over nearly the entire surface of an effective display region. For example, the opposed electrode 30B is an electrode having transparency, such as ITO (indium tin oxide). The individual pixels have slit parts 31 in the same pattern as in the pixel electrode 20B. In this case, the slit parts 21 of the pixel electrodes 20B and the slit parts 31 of the opposed electrodes 30B are not disposed in face-to-face relationship. Thus, when a driving voltage is applied, an oblique electric field is exerted on the long axes of the liquid crystal molecules. This permits improvement of the response speed against voltage, and also formation of regions having different alignment directions within a pixel (domain division of alignment), thereby improving viewing angle characteristics.

The liquid crystal layer 40 is composed of a vertical alignment type liquid crystal, which contains, for example, liquid crystal molecules 40A having a negative dielectric anisotropy, and polymers 40B for holding the liquid crystal molecules 40A in the vicinity of the interface with the alignment films 22 and 32. The liquid crystal molecules 40A have the property that the dielectric constant in the molecular long axis direction is smaller than that in the molecular short axis direction. Owing to this property, when a driving voltage is off, the long axes of the liquid crystal molecules 40A are aligned vertically to the substrates, and when the driving voltage is on, the long axes of the liquid crystal molecules 40A are aligned in a tilted position parallel to the substrates. The polymers 40B are composed of monomers, for example, ethoxy-biphenol diacrylate, ("NK ester A-BP-2E" (product name), manufactured by Shin-Nakamura Chemical Co., Ltd.).

In the first region 10A, the liquid crystal molecules 40A are held in a pre-tilt state by the polymers 40B. The liquid crystal molecules 40A in the first region A have a larger pre-tilt angle than that in the second region 10B. The pre-tilt angle of the liquid crystal molecules 40A in the first region 10A is preferably 11 to 12°. This enables more effective improvement of the response speed against voltage in a low gray scale.

Figure 4:
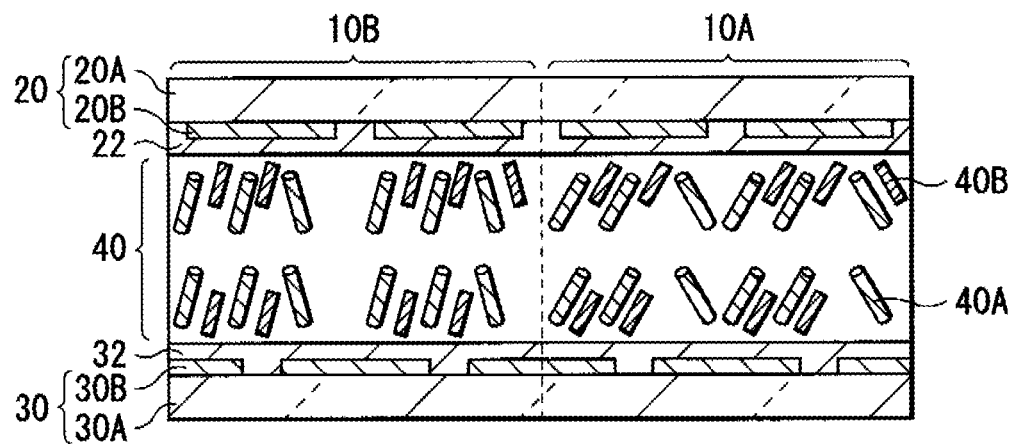
FIG. 4 is a schematic cross-sectional view of an example of other configuration in the preferred embodiment.

The pre-tilt angle of the liquid crystal molecules 40A in the second region 10B is 0°. That is, the long axes direction of the liquid crystal molecules 40A are aligned vertically to the substrate plane. Alternatively, as shown in FIG. 4, the liquid crystal molecules 40A in the second region 10B may have a pre-tilt angle smaller than that in the first region 10A.

The alignment films 22 and 23 are composed of an organic material, such as polyimide, and are vertical alignment films for vertically aligning the liquid crystal molecules 40A with respect to the substrate plane.

Alternatively, the alignment films 22 and 32 may be further subjected to processing for regulating alignment direction, such as rubbing.

A method of manufacturing the liquid crystal display having the above configuration will be described below.

Figure 2:
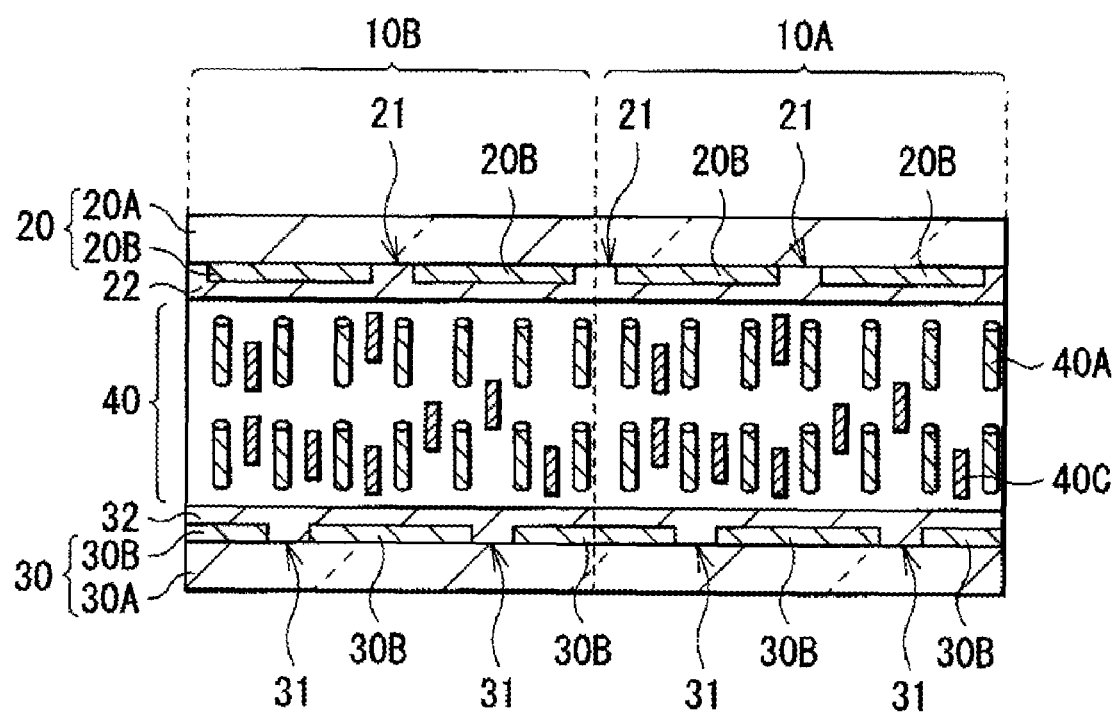
FIG. 2 is a schematic cross-sectional view for explaining a method of manufacturing the liquid crystal display in FIG. 1.

As shown in FIG. 2, the liquid crystal layer 40 is sealed between the TFT substrate 20 and the CF substrate 30, with the alignment films 22 and 32 in between.

Specifically, the TFT substrate 20 and the CF substrate 30 are formed by disposing, on the glass substrate 20A and the glass substrate 30A, the pixel electrode 20B and the opposed electrode 30B having predetermined slit parts 21 and 31, respectively. Thereafter, the alignment films 22 and 23 are formed on the pixel electrode 20B and the opposed electrode 30B, respectively, by applying a vertical alignment material, or printing a vertical alignment film on the substrate, followed by firing. On the other hand, the monomers 40C are added to the liquid crystal molecules 40A to compose and form the liquid crystal layer 40. Alternatively, a photopolymerizing initiator or the like may be added to the liquid crystal layer 40. The monomers 40C has the property that they are polymerized to be polymers 40B by irradiation of ultraviolet light etc (photopolymerization), heating (thermal polymerization), or the like.

Next, spacer projections for ensuring a cell gap, such as plastic beads, are dispersed in either surface of the TFT substrate 20 or the CF substrate 30, on which the vertical alignment film 22 or 32 is formed. Subsequently, a seal part is printed using epoxy adhesive or the like by, for example, screen printing method. Thereafter, the TFT substrate 20 and the CF substrate 30 are stuck to each other, with the spacer projections and the seal part in between, so that the vertical alignment films 22 and 32 can be opposed to each other. It is followed by admission of the composed liquid crystal layer 40. The seal part is then cured to seal the liquid crystal layer 40 between the TFT substrate 20 and the CF substrate 30.

As shown in FIG. 3A, a voltage V is applied between the pixel electrode 20B and the opposed electrode 30B by using voltage applying means 1. For example, the voltage V of 5V to 30V is applied to align the liquid crystal molecules 40A so as to be tilted in a direction. The tilting angle of the liquid crystal molecules 40A can be substantially equal to a pre-tilt angle imparted in the final step. Therefore, the magnitude of the pre-tilt angle of the liquid crystal molecules 40A can be adjusted by properly controlling the magnitude of the voltage V.

Further, with the above voltage V applied, the monomers 40B in the first region 10A of the liquid crystal layer 40 are polymerized. Particularly, the monomers 40C are photopolymerized by irradiating ultra-violet light UV to the liquid crystal layer 40. More particularly, only the first region 10A is exposed, while shielding the second region 10B with a mask having a predetermined opening pattern (not shown), or the like. Under the exposure, the photopolymerization initiator within the composition becomes radical, and the monomers 40C are polymerized. Thus, the tilting state of the liquid crystal molecules 40A of the first region 10A can be held by the polymers 40B, and a pre-tilt angle according to the magnitude of the voltage V can be imparted. Then, returning to the state where no voltage is applied, the liquid crystal molecules 40A in the unexposed region (the second region 10B) are returned to the vertical aligned state.

As shown in FIG. 3B, in the second region 10B, the monomers 40C are polymerized with no voltage applied, so as to hold in the state where the liquid crystal molecules 40A are vertically aligned with respect to the substrate plane (the liquid crystal molecules 40A have a pre-tilt angle of zero). This completes the liquid crystal display as shown in FIG. 1.

Alternatively, the second region 10B may also have a pre-tilt angle by performing the same steps as in the case of the first region 10A (not shown). It is however required to satisfy the following relationship between voltages $V_1$ and $V_2$, namely $V_1 > V_2$, where $V_1$ is a voltage applied to polymerize the monomers 40C in the first region 10A, and $V_2$ is a voltage applied to polymerize the monomers 40C in the second region 10B. Under these conditions, the pre-tilt angle of the liquid crystal molecules 40A in the first region 10A can be larger than that in the second region 10B. Although the first region 10A and the second region 10B are separately subjected to the step of polymerizing the monomers 40C, with the voltage applied, the sequence of these polymerization steps is free to select.

A description will next be made of the effects of the liquid crystal panel as shown in FIG. 1, and the method of manufacturing the same.

In the liquid crystal display of the present embodiment, a driving voltage according to image data is applied between the pixel electrode 20B and the opposed electrode 30B. In response to the voltage, the liquid crystal molecules 40A will lie to perform display by light transmittance and light modulation. Owing to the feature that the pre-tilt angle of the liquid crystal molecules 40A of the first region is larger than that of the liquid crystal layer 40 of the second region 10B, when the driving voltage is low (in a low gray scale), the response speed against the voltage is low, and the response of the light crystal molecules 40A is initiated from a region having a relatively large pre-tilt angle. Hence, as shown in FIG. 5, the liquid crystal molecules 40A in the first region 10A will respond first. On the other hand, when the driving voltage is high (in a high gray scale), the response speed against the voltage is sufficiently high, and the liquid crystal molecules 40A even in a region having a relatively small pre-tilt angle can respond promptly. Hence, the liquid crystal molecules 40A can respond in both of the first and second regions 10A and 10B, as shown in FIG. 6.

Figure 8:
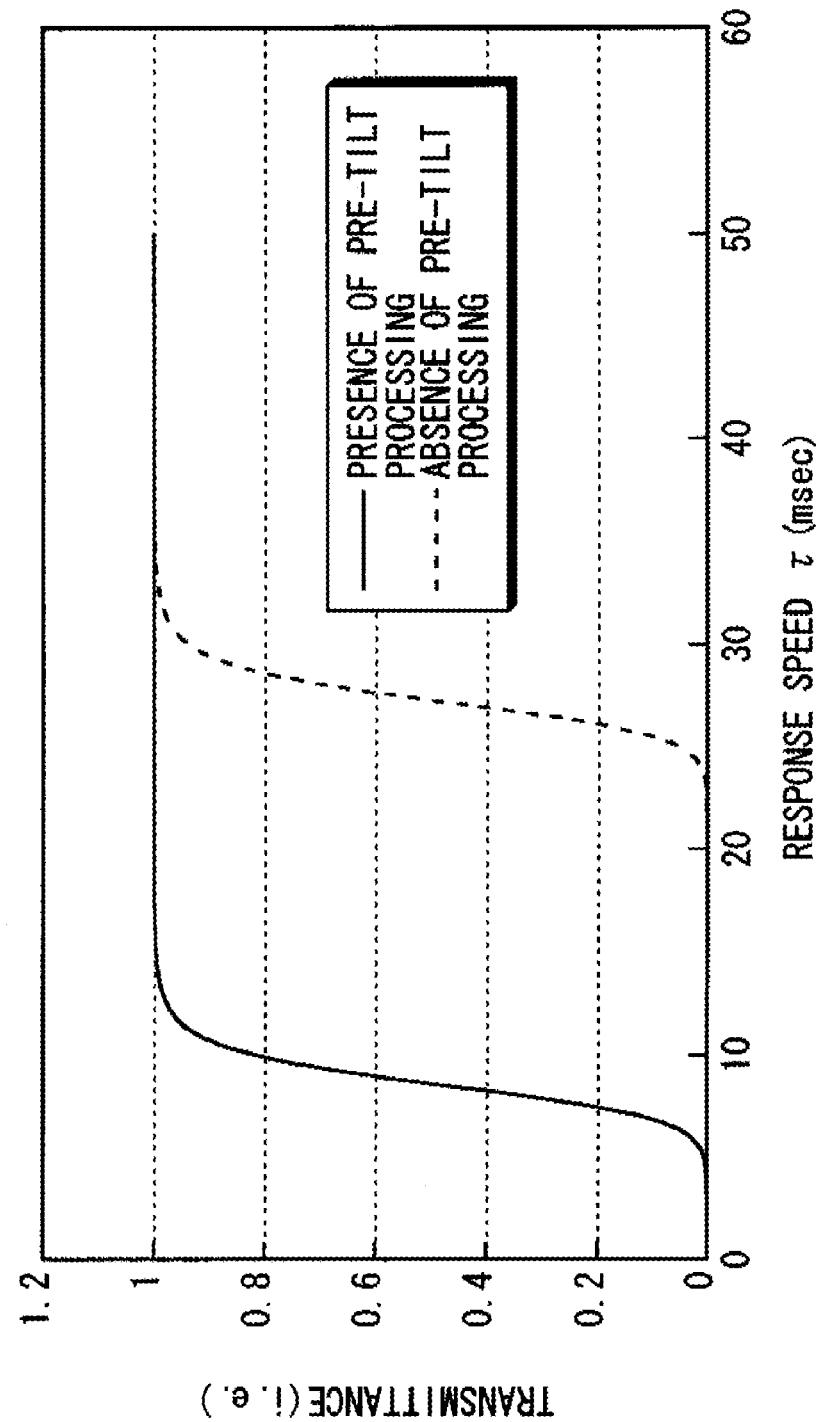
FIG. 8 is a characteristic diagram showing the relationship between response speed and transmittance in a low gray scale.
Figure 9:
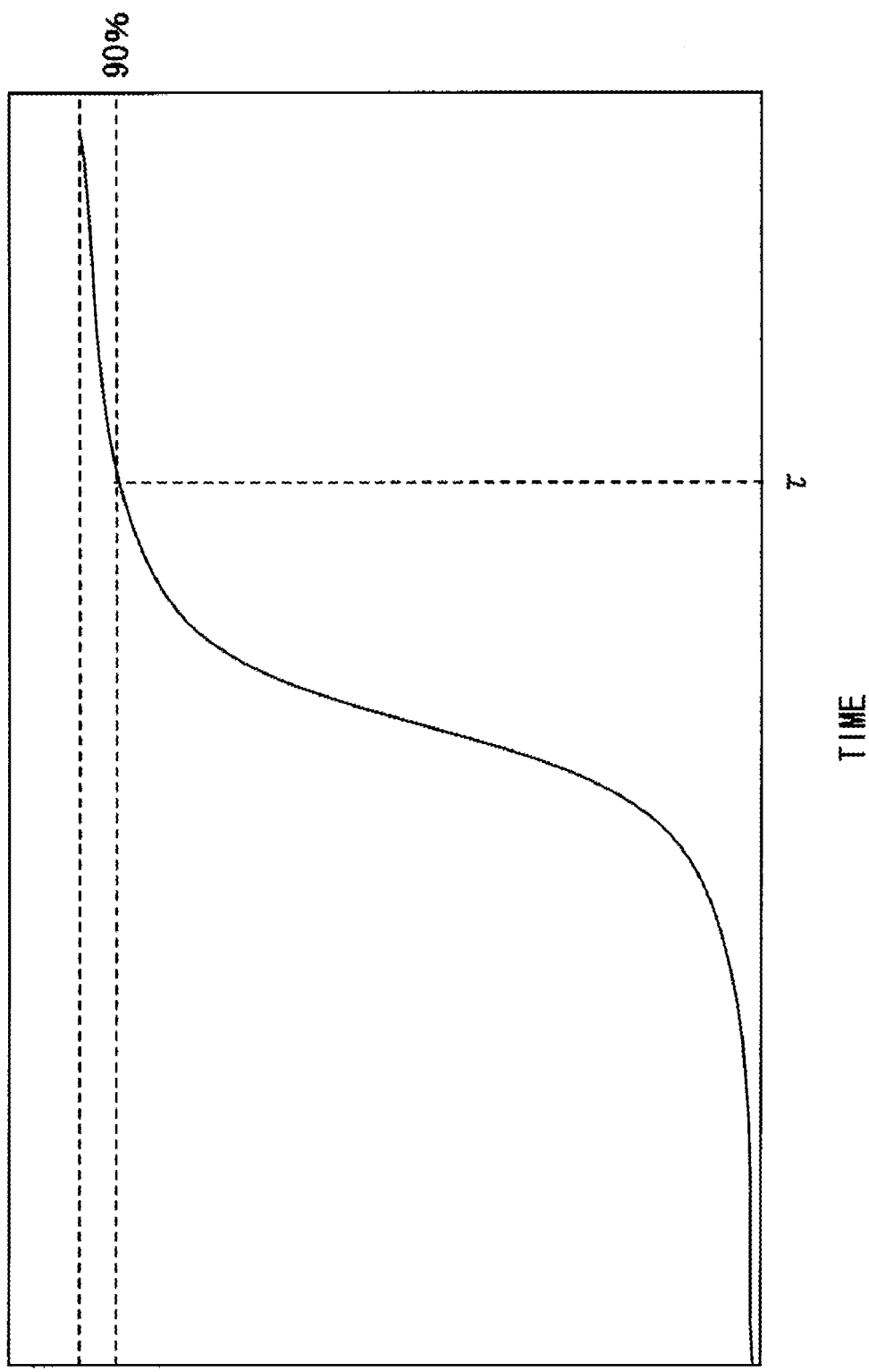
FIG. 9 is a diagram for explaining the response speed.
Figure 10:
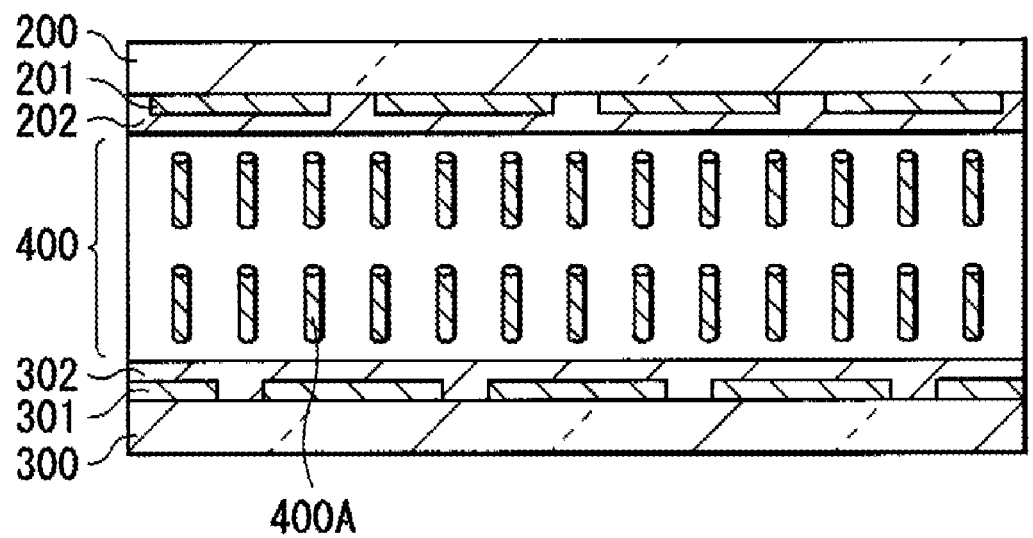
FIGS. 10 and 11 are schematic cross-sectional views of a liquid crystal display of related art.

FIG. 8 shows the results of simulation of a response speed τ against voltage in a low gray scale in the presence or absence of pre-tilt processing. The term "response speed τ" means the time (msec) between application of a driving voltage and achievement of a required 90% transmittance. It can be seen from the obtained results that the presence of the pre-tilt angle can considerably improve the response speed against voltage in the low gray scale. Consequently, the response speed against voltage, particularly in the low gray scale, can be considerably improved than the liquid crystal display in the absence of pre-tilt processing, as shown in FIG. 10.

Figure 11:
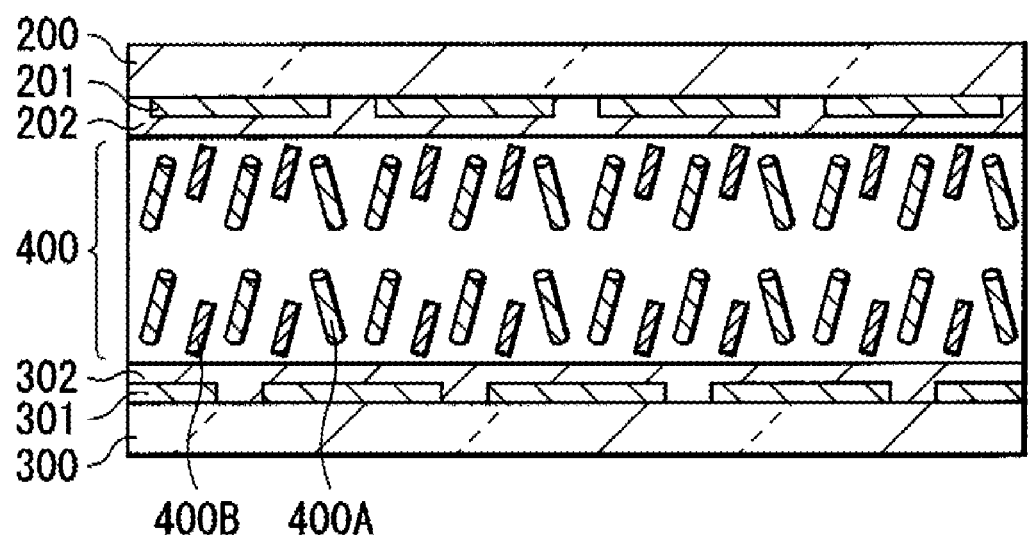

On the other hand, in the second region 10B, where the pre-tilt angle of the liquid crystal molecules 40A is smaller than that in the first region 10A, an increase in luminance when displaying black (with no voltage applied) can be reduced to suppress a drop in contrast in comparison with the liquid crystal display where the same magnitude of a pre-tilt angle is imparted throughout the entire surface of the liquid crystal layer 40, as shown in FIG. 11. For a high gray scale, the response speed against voltage is sufficiently high. Therefore, even if the pre-tilt angle imparted to the liquid crystal molecules 40A is relatively small, there is no possibility that the response speed is lowered than that in the low gray scale. This enables well-balanced improvement of contrast and the response speed against voltage in the liquid crystal display as a whole.

Especially, in the second region 10B, the pre-tilt angle of the liquid crystal molecules 40A is set to 0° so as to obtain a vertical alignment with respect to the substrate plane. The second region 10B blocks transmittance of light when displaying black, enabling more effective improvement of contrast.

In the method of manufacturing a liquid crystal display according to the present embodiment, the pre-tilt angle is imparted to the liquid crystal molecules 40A in the first region 10A, and the liquid crystal molecules 40A in the second region 10B are brought into the vertical alignment state with respect to the substrate plane, by adding the monomers 40C to seal the liquid crystal layer 40 between the TFT substrate 20 and the CF substrate 30, and then polymerizing, with the voltage V applied, the monomers 40C of the first region 10A in the liquid crystal layer 40. This permits manufacturing of the liquid crystal display enabling well-balanced improvement of contrast and the response speed against voltage.

Alternatively, by polymerizing the monomers 40C, with different voltages $V_1$ and $V_2$ ($V_1$>$V_2$) applied to the first and second regions 10A and 10B, respectively, the liquid crystal molecules 40A of the first region 10A can be provided with a pre-tilt angle larger than that of the liquid crystal molecules 40A of the second region 10B. Therefore, the magnitude of the pre-tilt angle of the liquid crystal molecules 40A in the first and second regions can be controlled by properly adjusting the magnitude of the voltage applied to these regions in the liquid crystal layer 40. Hence, the relationship between contrast and response speed can be optimized in accordance with the purpose and the specification of the liquid crystal device.

The following are examples of the present embodiment.

A vertical alignment film was applied to a TFT substrate where spacer projections of 4 μm were formed, and to a substrate where ITO electrodes were arranged on a color filter. A slit pattern was formed in ITO so that an oblique electric field can be exerted thereon, having a stroke width of 60 μm and spacing of 10 μm. A seal was formed on the substrate, and a composition made up of negative liquid crystal, acryl monomers and a photopolymerization initiator was dropped and admitted in an area surrounded by the seal. The substrates were then stuck to each other, and the seal was cured. Each display pixel of a liquid crystal panel thus manufactured had first and second regions having different pre-tilt angles. That is, the first region was obtained by irradiating ultra-violet light, with a voltage of 5V applied. The second region was obtained by irradiating ultra-violet light, with a voltage of 1.5V applied.

The display pixels thus manufactured were driven. The response speed τ in a low gray scale was 11 ms, and the contrast was 600. On the other hand, in the pixels in the absence of the pre-tilt as shown in FIG. 10, the response speed τ in a low gray scale was 30 ms. In the pixels in the presence of the pre-tilt throughout the entire surface of the substrate as shown in FIG. 11, the contrast was 400. It was confirmed from these results that the presence of the regions having different pre-tilt angles enabled well-balanced improvement of contrast and the response speed against voltage.

While the present invention has been described by the foregoing embodiment and examples, without limitation, many changes and modifications may be made. For example, though a pixel is divided into two regions having different pre-tilt angles, the present invention is also applicable to the cases of three or more regions having different pre-tilt angles. This enables more enhanced optimization of the relationship between contrast and the response speed against voltage.

It should be understood by those skilled in the art that various modifications, combinations, sub-combinations and alterations may occur depending on design requirements and other factors insofar as they are within the scope of the appended claims or the equivalents thereof.

What is claimed is:

1. A method of manufacturing a liquid crystal display comprising steps of:
   sealing, between a couple of substrates disposed facing each other, a liquid crystal layer composed of a vertical alignment liquid crystal containing monomers;
   polymerizing the monomers in a first region within a pixel, with a first voltage applied between the couple of substrates holding the liquid crystal layer in between; and
   polymerizing the monomers in a second region within the pixel, with a second voltage different from the first voltage applied between the couple of substrates holding the liquid crystal layer in between.

2. The method of manufacturing a liquid crystal display according to claim 1, wherein one of the first voltage and the second voltage is 0V.

* * * * *